United States Patent Office 3,225,024
Patented Dec. 21, 1965

3,225,024
POLYETHYLENE SYNTHESIS
Gaetano F. D'Alelio, South Bend, Ind., assignor to W. R. Grace & Co., New York, N.Y., a corporation of Connecticut
No Drawing. Filed May 7, 1963, Ser. No. 278,738
2 Claims. (Cl. 260—94.9)

This application is a continuation-in-part of my copending application Serial No. 693,252, filed Oct. 30, 1957, now abandoned.

The present invention is directed to polymerizing ethylene in an inert solvent in the presence of a catalyst prepared by grinding under inert conditions a mixture consisting essentially of titanium metal and $TiCl_3$.

It is known to prepare a catalyst for the polymerization of ethylene by ball milling together a mixture of Al and $TiCl_3$, followed by heating the result at 200° C. for 18 hours, thereby giving a product comprising essentially $TiCl_2$. This procedure is disclosed in French Patent 1,132,506 to Bayer (Example 9). This same patent also discloses ball milling all or part of the product obtained by heating Al powder and $TiCl_4$ at high temperatures to give a catalyst that will polymerize ethylene. (See Example 6 and 11 of the patent.) The product that is ball-milled in Example 6 is said to be $Ti Cl_2$, Ti, and Al, possibly with some $Ti Cl_3$. The product that is ball-milled in Example 11 is apparently a mixture of Ti, Al, $iCl_2$, $TiCl_3$, and $AlCl_3$.

My invention differs from the Bayer technique in that I have discovered that the product obtained by grinding together Ti and $TiCl_3$ alone (no Al, no $TiCl_2$) can be used directly as an olefin-polymerization catalyst, without prior or subsequent heating (except insofar as it is heated in the polymerization step).

The following examples illustrate without limiting the invention.

*Example 1*

Five grams of granulated Ti sponge and 3.6 grams $TiCl_3$ were ball-milled together under pure dry nitrogen for 44 days in a conventional stainless steel ball mill of 1 liter capacity, which was about ½ full of ½ inch stainless steel balls. Two grams of the resulting catalyst were suspended in 50 ml. toluene in a 200 ml. stainless steel rocking autoclave. The transfer from the mill to the autoclave was made in a dry box under a slight pressure of nitrogen to avoid contamination with moisture and oxygen. (The catalyst is pyrophoric and is extremely sensitive to such contaminants, and therefore should be handled at all times under inert conditions.) After the catalyst was transferred to the autoclave, the autoclave was sealed and pressured with ethylene to about 500 p.s.i. and heated at a temperature of about 130° C. for 24 hours. The autoclave was repressured with ethylene from time to time to maintain the pressure at about 500 p.s.i. After the run had been completed, the autoclave was cooled, vented, opened, and the crude polyethylene product recovered. The yield was 59.3 g.

The reaction product, if desired, may be purified by boiling in methanol containing hydrogen chloride, by techniques well known to those skilled in the art.

The catalyst as above prepared is useful in polymerizing ethylene at temperature ranging from about room temperature up to about 200° C., and even higher, and at pressures ranging from a few atmospheres, for example 100 p.s.i, to pressures as high as 10,000 p.s.i., and even higher. For practical operation, however, temperatures in the range of 50–200° C., and pressures of 200–1000 p.s.i. are suitable.

The polymerization reaction is suitably carried out in an inert solvent. Hydrocarbon solvents free from contaminants (especially free from oxygen and oxygen-containing compounds) are preferred. Among the suitable solvents are pentane, hexane, heptane, cyclohexane, octane, benzene, xylene, toluene, and the like.

The amount of activated catalyst is not critical. Relatively small amounts are operable to form relatively large amounts of polymer. In general, a practical range is 0.001 to 1 g. of catalyst per gram of ethylene polymerized. Even larger amounts are operable, but not necessary.

In conducting the ball milling operation it is often convenient to carry it out in the "wet" way. For example, a hydrocarbon may be added to the mixture to be ball milled, preferably one that will not interfere with the subsequent polymerization reaction. Solvents suitable for use in the polymerization reaction as above described are in general suitable for wet ball milling. The use of such a hydrocarbon in the ball-milling step provides a slurry of the catalyst in an inert medium which is easily handled. If the mixture is ground in the "dry" way, this should be done under an inert atmosphere such as pure dry nitrogen or a noble gas. The resultant milled mixture is extremely pyrophoric and should be handled under an inert atmosphere. If desired the milling can be carried out under an inert atmosphere of nitrogen or the like, and then the milled mixture can be flushed from the mill with an inert hydrocarbon. Reactive or polymerizable materials, e.g., ethylene, should be excluded from the milling apparatus. Similarly, the milling can be carried out partly in an inert atmosphere and then an inert hydrocarbon can be added to the mill toward the end of the milling in order to slurry the product for ease of handling.

The milling should be carried out under ambient conditions of temperature and pressure. Under these conditions the mill does not warm up, and in fact runs cool to the touch.

Any grinding or milling whatever of a mixture consisting essentially of Ti and $TiCl_3$ will provide a catalyst of some activity. Preferably, however, the milling or grinding should be conducted for at least several hours, and suitably for at least several days. The $Ti:TiCl_3$ weight ratio can vary considerably, e.g., over the range of 1 Ti:100 $TiCl_3$ to 100 Ti:1 $TiCl_3$.

The polymerization reaction can be carried out for residence times in the range of 2 to 48 hours. Generally, the reaction will be found to be substantially complete within 10–24 hours.

The polyethylene obtained by practice of this invention can be used in any conventional manner now being used by polyethylenes formed by prior art procedures. Such uses include film, molding, pipe, tubing, filament, extruded articles and the like.

I claim:
1. The method of polymerizing ethylene that comprises heating ethylene in an inert hydrocarbon reaction medium at a pressure of at least 100 p.s.i. and at a temperature of 20–200° C. in the presence of a catalyst prepared by grinding at room temperature and atmospheric pressure in an inert atmosphere in the absence of ethylene a mixture consistingof Ti and $TiCl_3$ in a $Ti:TiCl_3$ weight ratio of 1–100:1–100.
2. The method according to claim 1 in which the polymerization temperature is about 130° C., the pressure is about 500 p.s.i., and the hydrocarbon is toluene.

No references cited.

JOSEPH L. SCHOFER, *Primary Examiner.*
W. H. SHORT, *Examiner.*